Jan. 10, 1961   F. E. SACHERS   2,967,688
ADJUSTABLE MOTOR MOUNT
Filed Aug. 27, 1959

FRITZ E. SACHERS
INVENTOR.

BY Daniel A. Bobis
Atty

United States Patent Office 2,967,688
Patented Jan. 10, 1961

2,967,688
ADJUSTABLE MOTOR MOUNT

Fritz E. Sachers, Oil City, Pa., assignor to Worthington Corporation, Harrison, N.J., a corporation of Delaware Filed Aug. 27, 1959, Ser. No. 836,544

1 Claim. (Cl. 248—23)

This invention relates to adjustable motor bases and more particularly to motor bases used in variable speed drive systems.

In the common type of variable speed drive, an adjustable motor mount is used to adjust the pitch of a spring loaded motor pulley to vary the speed of a driven unit which is operatively connected to the motor pulley by means of a V-belt and companion sheave. For best operation it is desirable to provide a motor mount which in addition to adjusting motor location also moves in such fashion whereby the V-belt is maintained in alignment with the companion sheave on the driven unit. There are a number of bases currently employed in the art for the above purposes which, together with the present invention, are rather generally based on the same fundamental conception. Thus, a straight motor mount is offset to conform to the system with which it is associated to provide the movement for varying the speed and maintain the proper belt alignment.

Within the broad limits just defined, there is much room for improvement. From a practical standpoint many of the bases employed embody devices which are complex and expensive to manufacture to provide a base which at times may befuddle the ordinary workmen.

Accordingly it is an object of the present invention to provide a simple, practical and positive motor mount for use with variable speed systems.

It is another object of this invention to provide an adjustable motor mount that can be manufactured at low cost and is adapted for use on a wide range of variable speed type systems.

With these and other objects in view, as may appear from the accompanying specification, the invention consists of various features of construction and combination of parts, which will be first described in connection with the accompanying drawings and the features forming the invention will be specifically pointed out in the claim.

Figure 1:
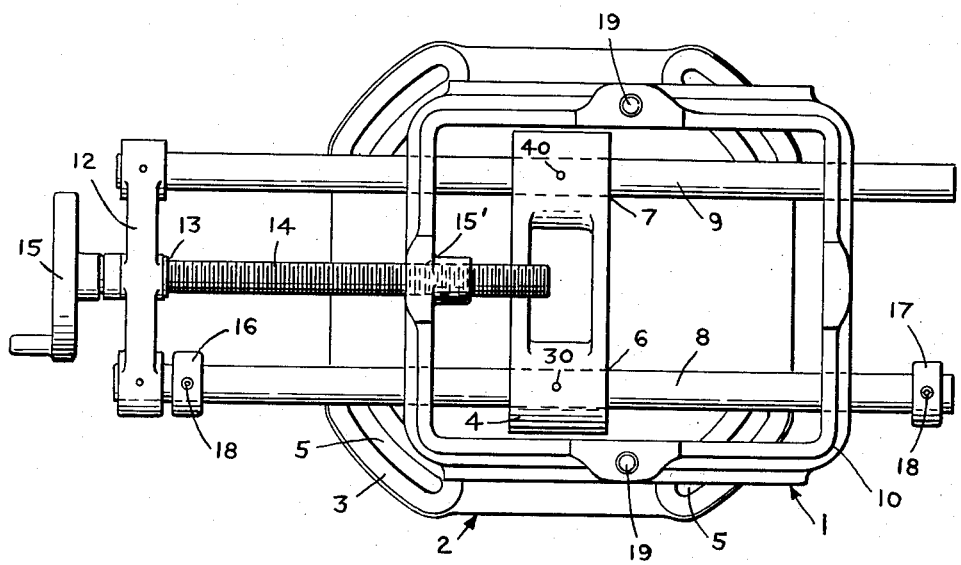
Figure 1 is a top view of the base and frame portion of the adjustable motor mount contemplated herein.
Figure 2:
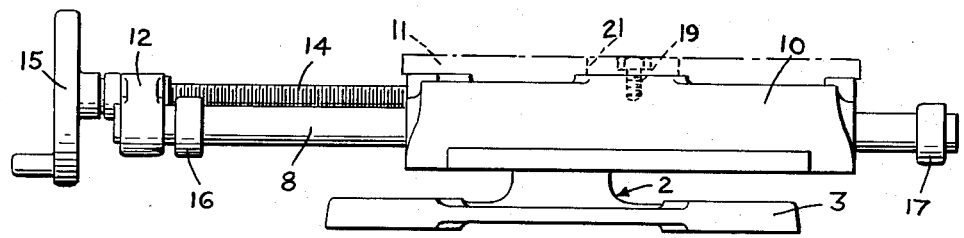
Figure 2 is a side view of the adjustable motor mount.
Figure 3:
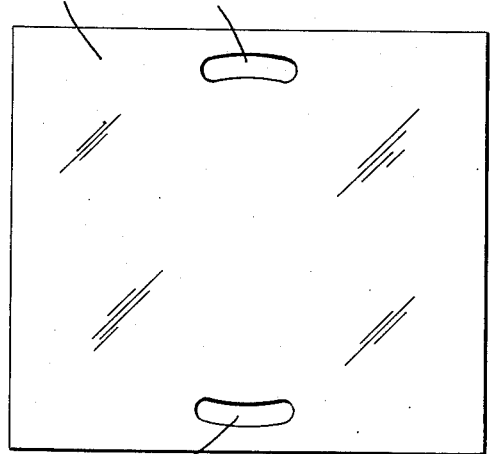
Figure 3 is a top view of the plate showing the adjustable means for detachably connecting same to the frame portion of the mount.

Referring more particularly to the drawings, Figure 1 thereof illustrates the adjustable motor base, generally designated 1, contemplated herein and comprises a base portion generally designated 2 which includes a plate 3 in the lower portion thereof and a rigid block type upper section 4.

Adjustment of the motor mount 1 to a number of desired positions is accomplished by providing adjusting means in the plate-like lower section which take the form of radially slotted holes 5 at the opposite ends thereof.

The block portion 4 is provided with holes 6 and 7 which accommodate plural guide rods 8 and 9 therein. Pin means 30 and 40 or the like are used to rigidly hold the guide rods 8 and 9 in spaced horizontal parallel relation with respect to each other.

A frame 10 which carries the motor mounting plate 11 as described hereinafter is slidably mounted on the guide rods 8 and 9. A bearing housing 12 is mounted on one of the ends of the guide rods and provides a housing for bearing 13 which receives the moving means taking the form of a threaded rod with a turn wheel 15 at one end and operatively connected to the frame 10 through threaded hole 15' to move same along the guide rods as desired. Stop means 16 and 17 taking the form of bushing members are mounted on the guide rods 8 and 9 and set through set screw 18 to limit the forward or backward movement of frame 10 to a predetermined amount.

The rectangular frame 10 is further provided with drilled holes 19 for receiving in a predetermined position the plate 11. The plate 11 is shown as including crescent-shaped slots or holes 20 and 21 whereby adjustment to proper angular relation with respect to the axis of the rod 14 may be made. This is a necessary feature as different systems required the plate to be located at different angles with respect to the axis of the rod 14. In addition, fashioning the plate 11 as a separate unit permits standardization in the manufacturing operation. It is therefore only necessary to mount the plate which may be set at any desired angle and when taken in connection with the adjustability factor provided for by the holes in the plate 3 there is provided a versatile motor mount which may rapidly be adapted to operate with any type of variable speed operation, and such unit is shown in Patent No. 2,202,553.

In operation a motor (not shown) is mounted on the plate 11 which has been set at a desired angle by adjustment through the radial slots 20 and 21. Further adjustment is made by locating the plate 3 through the slots 5 to the proper location and both of the above coact to permit forward and backward movement of the motor by action of wheel 15 with a proper amount of motor lateral movement to maintain proper belt alignment and thereby reduce sag and permit more efficient operation of a variable speed unit.

It will be understood that the invention is not to be limited to the specific construction or arrangement of parts shown, but that they may be widely modified within the invention defined by the claim.

What is claimed is:

An adjustable motor mount for positioning a motor relative a driven member and comprising, in combination, a generally rectangular base portion including a plate-like lower section having arcuate elongated bolt-receiving slots formed in the corners thereof for fixing said base portion in a suitable position relative said driven member, said base portion further including a block-like upper section, plural guide rods fixedly mounted in said block-like upper section and spaced parallel in relationship to one another, a frame having holes therein receiving said guide rods therethrough and slidably mounting said frame on said guide rods so that said frame is able to translate longitudinally along said guide rods but is restrained from wobbling on said guide rods, a motor receiving plate, mount means for connecting said motor to said motor receiving plate, said motor receiving plate having a flat bottom surface to facilitate preassembly with said motor, connecting means comprising crescent-shaped slots through said motor receiving plate for detachably connecting said motor-receiving plate on said frame, said crescent-shaped slots adapted to receive bolts for connecting said motor-receiving plate to said frame so that the angular alignment of said motor relative said driven member can be varied, moving means connected to said frame for translating said frame longitudinally along said guide rods, stop means comprising collars mounted about said guide rods outwardly of said frame and adapted to abut said frame for restraining the movement of said frame to position said motor a desired distance from said driven member.

References Cited in the file of this patent

UNITED STATES PATENTS 1,941,417   Reeves ---------------- Dec. 26, 1933

FOREIGN PATENTS 635,488   France ---------------- Dec. 28, 1927